April 6, 1954 P. K. WEIMER 2,674,704

STORAGE TUBE FOR COLOR TELEVISION SIGNALS, ETC

Filed Dec. 28, 1950

2 Sheets-Sheet 1

INVENTOR
Paul K. Weimer
BY
William A. Zalesak
ATTORNEY

April 6, 1954 P. K. WEIMER 2,674,704

STORAGE TUBE FOR COLOR TELEVISION SIGNALS, ETC

Filed Dec. 28, 1950 2 Sheets-Sheet 2

INVENTOR
Paul K. Weimer
BY
William A. Zalesak
ATTORNEY

Patented Apr. 6, 1954

2,674,704

UNITED STATES PATENT OFFICE 2,674,704

STORAGE TUBE FOR COLOR TELEVISION SIGNALS, ETC.

Paul K. Weimer, Princeton, N. J., assignor to Radio Corporation of America, a corporation of Delaware Application December 28, 1950, Serial No. 203,125

8 Claims. (Cl. 315—12)

This invention relates to improvements in the art of converting electrical signals of one variety into electrical signals of another variety.

The invention is herein described as applied to the solution of the relatively complex problem of converting color-television signals of one standard of transmission into color-television signals of another standard. However, it will be apparent as the description proceeds that the method and apparatus of the invention may be used for converting any of various types of electrical signals, representative of a composite "message," into any other of said types of signals, representative of the same "message."

When televising a scene in its natural colors the usual procedure is, first, to break the scene to be televised into its three component colors, then separately to broadcast the signals representative of each color and finally to superimpose said signals in the receiver, to achieve an "additive" color image of the original scene. There are various ways of doing this. Thus, when the "field-sequential" system is used, the scene to be televised is scanned in its entirety, first for one color and then for the other color or colors, successively. In the "line-sequential" system the scene is scanned (and its image is built-up) line-by-line for the different colors. In the "element-sequential" or "dot-sequential" system each sub-elemental area of the scene, and its image, is scanned first for one color, and then for each of the other colors, before moving on to the next adjacent area. In so-called "simultaneous systems" each elemental area is scanned simultaneously for each color.

The problem of converting color-television signals of one standard into signals of another standard may arise in rebroadcasting between countries or communities having different standards of transmission. The problem may also arise locally as where, in the interests of convenience or of secrecy, it is desired to use a color-television camera of one kind and a transmitter or a receiver of another kind. In any event, the foregoing and related problems have heretofore been recognized and various ingenious conversion methods and systems, applicable to color television, have been proposed. However, irrespective of the advantages claimed for the various conversion systems of the prior art, it may be said, generally, that they are more complex and costly than is desirable, in that they necessarily employ a separate storage tube for each componnet color (usually three; red, blue and green).

Co-pending U. S. applications Serial No. 782,803 of J. P. Smith, filed October 29, 1947; now U. S. Patent 2,587,005, and Serial No. 11,742 of R. D. Kell, filed February 27, 1948; now U. S. Patent 2,545,957 demonstrate the three-tube approach to the problem. H. A. Iams in U. S. Patent 2,213,-173 discloses a storage tube which could be used in a system analogous to the Smith and Kell systems. It would take three of Iam's tubes, however, to handle the three primary colors used in present day tri-color television systems. It need scarcely be pointed out that it is not easy to achieve perfect electrical and optical alignment in three-tube "storage" systems.

Stated generally, the principal object of the present invention is to provide an improved method of and apparatus for converting a train of electrical signals, representative of a composite image or other message, into another train of electrical signal representative of the same message.

Another and specific object of the present invention is to provide a relatively simple solution of the problem of converting color-television signals of one variety into color-television signals of another variety, and one which shall be free from alignment difficulties and other complications inherent in the color-television conversion systems of the prior art.

A related object of the present invention is to provide an improved electron-storage tube and one which shall be capable of accepting signals of one variety (e. g. "frame-sequential" signals), representative of a tri-color image and converting said signals into signals of another variety (e. g. "element" or "dot-sequential") representative of the same tri-color image.

The foregoing and other objects are achieved, in accordance with the invention, first, by applying the electrical signals representative of the different components of the composite "message" to separate electron-beams, or to a single beam, in the sequence dictated by the first transmission-standard. The beams (or beam parts) are then caused to trace closely adjacent image-rasters of the separate components of the signals composite message upon the "writing" surface of a two-sided storage-electrode. The "closely adjacent" arrangement of the rasters is achieved by directing the beams (or beam parts) along separate paths which cross and diverge in a plane adjacent to the storage-electrode.

During the tracing or scanning operation these rasters are divided into a multiplicity of discrete groups or families of electrons, as by passing the rasters through a mask containing a very large number of apertures. The mask is mounted in the cross-over plane of the beams. Hence, assuming that there are three components in the composite message, and one beam for each component, then what is "imaged" upon the storage-electrode during the scanning operation is a triple image of each mask-hole.

The storage-electrode converts the divided rasters into discrete electrostatic charges having a pattern of distribution corresponding to the distribution of the arriving electrons. The separate charges are finally removed from the opposite or "reading" surface of the storage-electrode, in the sequence dictated by the system or "standard" into which the original signals are to be converted, by scanning said opposite side of said electrode through a mask of the same apertured construction used in laying down the divided raster upon said electrode.

The invention is described in greater detail in connection with the accompanying two sheets of drawings, wherein.

*The storage tube—Generally*

Figures 1, 3:
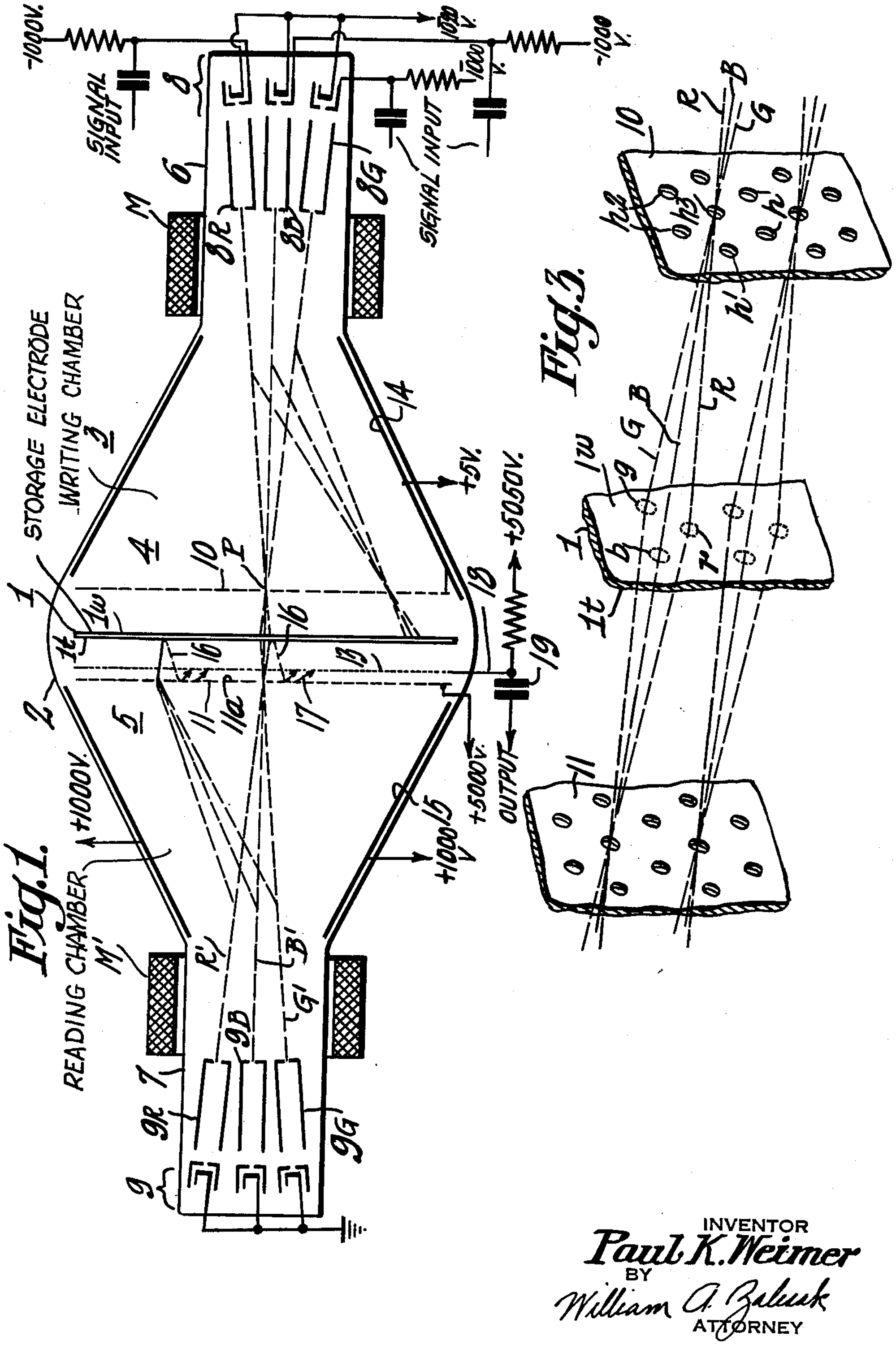
Fig. 1 is a partly diagrammatic longitudinal sectional view of a "six-gun" storage tube, constructed in accordance with the principle of the invention.
Fig. 3 is an enlarged fragmentary view in perspective of the storage electrode and its masks, the drawing being marked to show the manner in which the "writing" and "reading" beams approach the opposite sides of the storage electrode through the mask-apertures.
Figures 2, 4, 5:
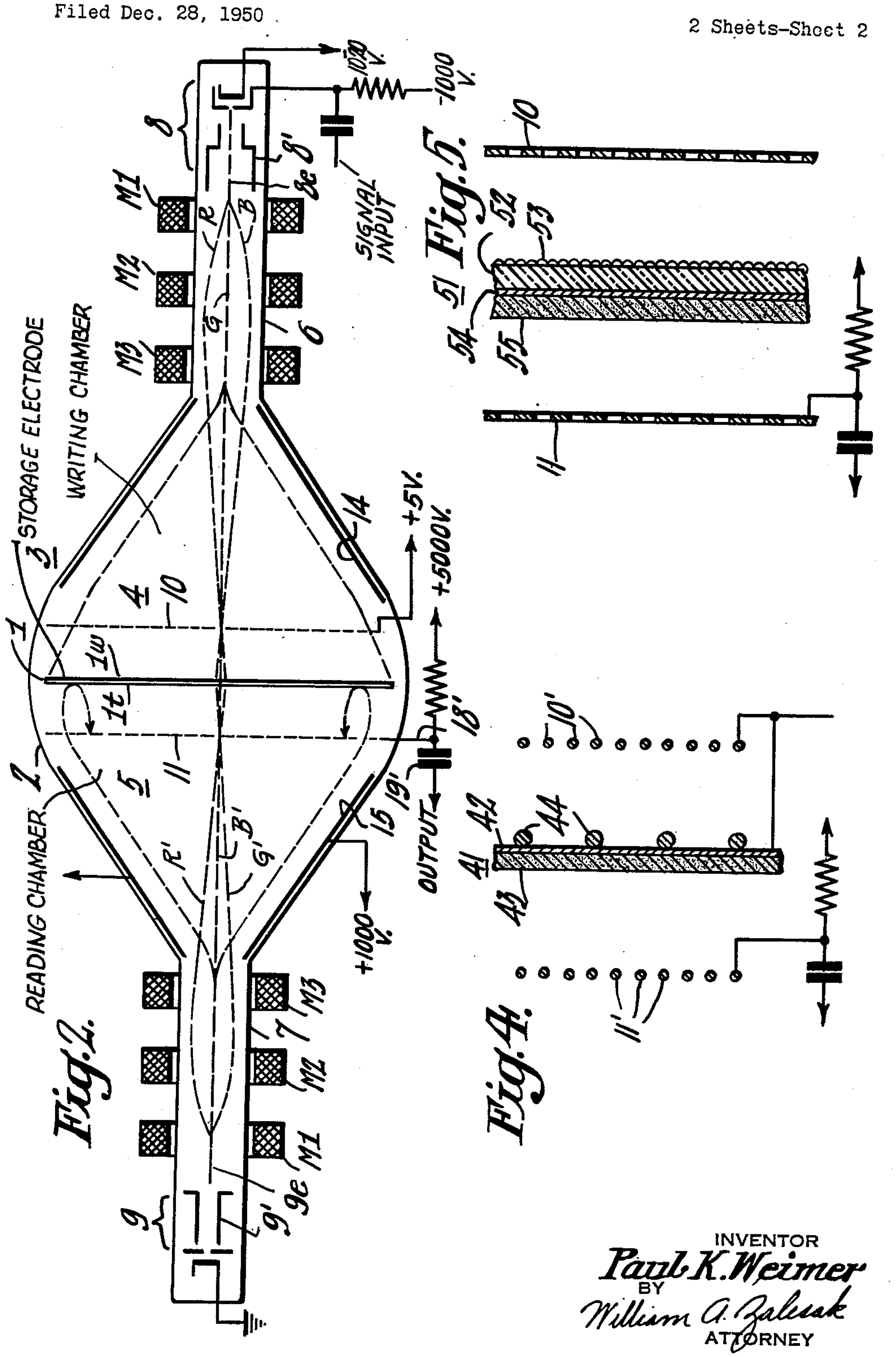
Fig. 2 is a similar view of a "two-gun" embodiment of the invention.
Figs. 4 and 5 are fragmentary sectional views showing alternative forms of storage-electrode and mask assemblies.

In the embodiment of the invention shown in Figs. 1 and 2 a two-sided storage electrode 1 divides the interior of the bulbous central portion 2 of an evacuated envelope 3 into a "writing chamber" 4 and a "reading chamber" 5. The vacuous space in these two chambers 4 and 5 may be continuous. The envelope terminates in a pair of outwardly extending axially aligned neck-portions, 6 and 7 respectively. The neck 6 that communicates with the writing chamber 4 contains a beam-source of electrons, indicated generally at 8, for the writing surface 1*w* of the storage electrode 1. The other neck 7 contains a similar source 9 for the reading or take-off surface 1*t* of said electrode. These separate beam-sources, 8 and 9, may comprise either a battery of say, three, guns (as shown in Fig. 1) or a single gun (as shown in Fig. 2).

As will hereinafter more fully appear, the electrons from the source 8 pass through the apertures in a "directional" type mask 10 (later described) before striking the writing side 1*w* of the storage electrode 1. Similarly, electrons from the source 9 pass through another mask 11 in approaching the reading side 1*t* of said electrode. The reading chamber 5 of the device of Fig. 1 also contains an output electrode 13 in the form of foraminous metal screen mounted in the space between the mask 11 and the reading surface 1*t* of the storage electrode 1. The separate output electrode 13 may be omitted, in which case the apertured mask 11 in the reading chamber 5 may be used as the output electrode, as shown in Fig. 3. Each of the two chambers 4 and 5 contains a "second-anode" in the form of a conductive coating 14 and 15, respectively, on the inner (glass) surface of the envelope 3.

*The storage electrode*

The centrally located storage-electrode 1 may be of any type capable of converting an arriving electron-raster into an electrostatic-image and retaining or "storing" the latter, at least momentarily. In Figs. 1, 2 and 3 of the drawings, the storage electrode 1 consists simply of a thin sheet of glass (as in U. S. Patents 2,403,239 and 2,473,220 to Albert Rose). Alternative forms of storage-electrodes are shown (at 41) in Fig. 4 and (at 51) in Fig. 5.

The storage electrode 41 in Fig. 4, is of the "graphicon" variety described by Louis Pensak in an article entitled "The graphicon—a picture storage tube" in the March 1949 issue of the "RCA Review," page 59 et seq. It comprises a thin layer of metal 42 coated on one side with a thin film or layer of insulating material 43 and supported on its opposite side by a wire screen 44 or other foundation of open work construction.

The alternative form of storage electrode shown at 51, Fig. 5, comprises a foundation 52 constituted of glass or equivalent insulating material, such as mica coated on one side with a light-emissive phosphor layer 53 and on its opposite side with an electrically conductive light-transparent coating 54. There is a layer 55 of photo-conductive material on top of the conductive layer 54. As is conventional in the image-tube art, the phosphor layer 53 and the photo-conductive layer 55 should be formed of similarly sensitive materials. Thus, if the light output of the phosphor 53 is "peaked" in a certain spectral region (say, "blue") the photo-conductive material 55 that is selected for use with that phosphor should exhibit a similarly "peaked" response-characteristic. The following materials are suggested: for the phosphor 53, zinc sulfide, for the light-transparent coating 54, sputtered-on palladium (or a "nesa" coating) and, for the photo-conductive material 55, amorphous selenium.

*The electron-guns*

As previously set forth, the beam source 8 for the writing surface 1*w* and the beam-source 9 for the reading or "take-off" surface 1*t* (of the storage electrode 1) may comprise either a battery of electron-guns (shown in Fig. 1) or a single electron-gun (shown in Fig. 2).

When a battery of guns is employed, the number of guns in the battery should preferably correspond to the number of separate images (or "messages") in the composite image (or "message") which the tube is designed to handle. Thus if the signals to be applied to the tube carry a tri-color television image the battery should contain three guns, one for each component color-image. In both of the three-gun batteries, 8 and 9 of Fig. 1, each gun and its beam is allotted to one of the primary colors. This is indicated in the drawings by the letters R (red), B (blue) and G (green).

As shown in Fig. 1, the arrangement of the three guns 8R, 8B and 8G (9R, 9B, 9G) is preferably such that the trajectories of their beams R, B and G (R′, B′, G′) intersect and diverge in the plane of the mask 10 (or 11) so that said beams eventually impinge upon discrete sub-elemental areas *r*, *b* and *g*, respectively, on the particular storage surface (1*w* or 1*t*) toward which they are directed. To this end, referring still to Fig. 1, one gun 8B (9B) of each battery may be mounted on the central axis of the tube and the other two guns 8R, 8G (9R, 9G) on opposite sides of the central gun and inclined toward said axis. When the guns are thus arranged, only one electro-magnetic coil assembly M (M') need be used for imparting the requisite scanning movement to all three electron-beams. Alternatively, as described in the Goldsmith application (Serial No. 762,175; now U. S. Patent 2,630,542), three guns (having separate beam-deflecting coils) may be disposed 120° apart about the central axis of the tube and tilted toward a common reference point on said axis in the plane of the mask. Still another way of arranging the three guns is to mount them all parallel to the central axis of the tube, delta (Δ) fashion, as described in the co-pending application of Schroeder, Serial No. 730,637; now U. S. Patent 2,595,548.

When, as shown in Fig. 2, the beam source (8 or 9) of the electrons comprises one gun (8') for the writing side (1w) and one gun (9') for the reading side (1t) of the storage electrode, each beam must be rotated and interrupted so that, during its scanning movement, it sequentially occupies the three separate positions of the three beams from the three-gun batteries of Fig. 1. The guns (8', 9') are thus similar in construction and operation to the one described by R. R. Law in co-pending application Serial No. 143,405, filed February 10, 1950. Three electromagnetic coils M1, M2 and M3, disposed in spaced array on each neck of the envelope, operate upon the electron-beam (8e, 9e) that emanates from each gun. As described in the Law application, the coil (M1) nearest the gun supplies the field required to rotate the beam. The central coil (M2) supplies the focusing field and the innermost coil (M3) supplies the scanning field.

*The masking electrodes*

As shown more clearly in Fig. 3, the apertures in the masks 10 and 11, used in the storage tube of Fig. 1 (see also Figs. 2 and 5) are of the "dot" type. These masks 10 and 11 may assume any of the various forms disclosed by Alfred N. Goldsmith in copending application Serial No. 762,175, filed July 19, 1947; now U. S. Patent 2,630,542. As here shown, each mask will be understood to consist of a taut thin-metal sheet containing the desired number of apertures h, h1, h2 etc. arranged in triangular groups of three in a "hexagonal pattern." (A "hexagonal pattern" is one wherein each aperture, except those on the boundaries of the pattern, is surrounded by six other apertures. The apertures themselves may be circular, rectangular or hexagonal in outline.)

As described by Goldsmith, each mask may comprise a metal or other fabric of open-work construction, or it may comprise an electron-permeable sheet containing an electron-opaque material laid down in intersecting lines which define the boundaries of numerous discrete electron-permeable areas. Accordingly, the word "aperture," as herein used, is not limited to its ordinary meaning but is intended also to include any electron-permeable "opening."

Alternatively, the masks for the storage electrode may contain a multiplicity of elongated slits or slot-like (instead of "dot-like") apertures. In this case the masks may consist of a number of very closely spaced parallel wires extending either horizontally or vertically across the writing and reading surfaces of the storage electrode. Two such masks, 10' and 11' are shown in Fig. 4. These wires may be maintained in spaced relation by one or more oppositely directed wire-like supports (not here shown), as in German Patent 736,575, or its French equivalent, 866,065.

The form and distribution of the apertures in the masks may be said to be entirely independent of the signals to be applied to or taken off the storage electrode. However, it is preferable that the masks be of similar, though not necessarily of "duplicate" construction. The principal requirement is that the apertures in the mask 11 (or 11') in the reading chamber 5 be so located and arranged that the reading beam or beams strike the separate charged areas (r, b, and g, Fig. 3) on the storage electrode. When (as in Fig. 1) the reading beams R' B' G' approach the storage electrode substantially at a right angle, the pattern of the apertures in the reading mask 11' is of the same length and width dimensions as the pattern of charges r, b and g on the storage electrode 1. The length and width dimensions of the pattern of apertures h, h1 etc. in the writing mask 10, on the other hand, may be smaller than the pattern of charges on the storage electrode, since the writing beam or beams approach the storage electrode obliquely at the edges of the raster. If the reading beams R' B' G' are caused to approach the storage electrode at the same angles as the writing beams R, B and G, the dimensions of the aperture-patterns in the masks 10 and 11 may, of course, be identical.

*The second anodes (14, 15) and the separate output electrode (13, Fig. 1)*

The conductive coating 14 on the inner surface of the writing chamber 4 serves, when maintained at a positive potential of, say 1000 volts, positive with respect to the cathodes of the writing guns 8, to collect the secondary-electrons which are released by impact of the beam or beams upon the writing surface 1w of the storage electrode 1. This secondary emission from the storage electrode causes it to be charged approximately to the same potential as the writing mask 10, which is connected to the conductive coating 14. When, as in Figs. 1 and 2, the reading beams are caused to strike the storage electrode at substantially zero velocity, the cathodes of the writing beams must be operated at about 1000 volts negative with respect to the cathodes of the reading beams. The reading beams may of course be operated at the same high velocity as the writing beams, if desired.

A metallic coating 15 on the inner surface of the reading chamber 5 is maintained at 1000 volts positive with respect to the cathodes of the reading-guns 9. When thus energized, this film-like second-anode 15 operates to accelerate the reading beam, or beams. The reading apertured-mask 11 is operated at a much higher voltage, say 5000 v. These voltages cause an electron-lens field to be established between the apertured mask and the second anode 15 which operates to bend or "normalize" the reading beam (or beams) so that it always approaches the reading surface at an angle of substantially 90°, as shown in both Figs. 1 and 2.

As previously pointed out, the storage tube of Fig. 1 (unlike the one shown in Fig. 2) has a separate output electrode. This output electrode is in the form of a foraminous screen 13 and is mounted in the space between the mask 11 and the reading side (1t) of the storage electrode 1. This screen 13 is actually the "collector" electrode of an electron-multiplier, the "dynode" (or cathode) of which comprises the adjacent (inner) surface of the masking electrode 11. If desired, the "inner" side 11a of the mask may be coated with silver magnesium oxide or equivalent material to render it the more highly emissive. The separate collector electrode 13 is normally biased a few volts positive with respect to the mask 11 and collects secondary-electrons produced by the "return beam" striking the emissive inner surface 11a of the mask. Since the storage electrode operates approximately at the potential of the cathodes of the reading guns, there is a strong electric field between the storage and output electrodes. This field serves both to decelerate the reading beam approaching the storage electrode and to accelerate the modulated return beam 16 which carries the output signal.

*Operation*

As previously mentioned, one use for the storage tube of the present invention is in the conversion of tri-color television signals of one standard of transmission into tri-color television signals of another standard of transmission. When the multi-gun tube of Fig. 1 is used for that purpose, individual ones of the electron-guns in the writing battery 8, are allotted to the signals that represent different ones of the (three) component colors of the tri-color image being televised. Thus, the signals that carry the red component of said image are impressed upon the grid of the "red" gun 8R, the blue component upon the "blue" gun 8B and the green signals upon the "green" gun 8G. As a result, the beams that emanate from said guns are each modulated by a signal representative of a different color component of the input tri-color image.

The guns 8R, 8B, 8G (Fig. 1) are normally trained upon a common point (say, the point P) on the mask 10. At this point, P, the paths of the beams R, B and G cross each other and diverge in approaching the writing surface 1w of the storage electrode 1. Hence (as shown more clearly in Fig. 3) whether the beams R, B and G pass through the mask hole $h1$ or $h2$ (or any other one of the holes $h$) each beam can impinge only upon the particular subelemental area $r$, $b$, $g$ which is allotted to that beam, and upon no other. By operating the deflecting coil assembly M (Fig. 1) in accordance with the transmission standard of the input signals, the separate beams R, B and G pass through the mask holes and scan separate image-rasters upon the writing surface 1w of the storage electrode 1. As a result, the storage electrode (1 Fig. 1; 41 Fig. 4; 51 Fig. 5) acquires a charge pattern in the form of a "composite electrostatic image." Each of (the three) image rasters, of which the "composite image" is comprised, is made up of a multiplicity of discrete charged-areas $r$, $b$ or $g$ (Fig. 3) of a charge-intensity dictated by the instantaneous intensity of the signals applied to the separate beams R, B and G, respectively.

The secondary-electrons, released by the impact of the high velocity writing beams upon the writing surface of the storage electrode, are collected upon the mask 10 and upon the conductive coating 14 on the inside of the bulbous portion of the writing chamber 4. The insulating nature of the storage electrode keeps the electric charges in the localized areas $r$, $b$ and $g$ until they are neutralized, in the manner later described, by the take-off beams R', B', G'.

The voltages applied to the deflection coil assembly M', which is associated with the reading or "take-off" beams R', B', G'; and the synchronization of said beams, are dictated by the transmission standard selected for the output signals. Thus, if a "dot sequential" output is desired, the field of the coil assembly M' should first be of an orientation and strength calculated to direct all three beams R', B' and G' to a particular mask hole. The beams are turned "on" in sequence and, upon completion of the sequence, the current in the coil assembly M' is changed to advance the beams to the next mask hole, and so on, until the entire mask has been scanned; whereupon the beams R', B', G' are directed back to the first hole and a new raster started.

The reading or "take-off" beams R', B', G' (Fig. 1) scan the reading mask 11 and pass through the apertures that are allotted to the dot-like charged areas $r$, $b$ and $g$ which were laid down on the storage-electrode by the writing beams R, B and G. The reading beams, in the instant case, are of a relatively low velocity and, after passing through their mask 11, merely touch the discrete charge areas ($r$, $b$ and $g$) on the reading side (1t) of the storage electrode (1). As a consequence, each reading-beam gives up only a sufficient number of its electrons to neutralize the positive charge created in that particular area by the action of the high-velocity writing beams (R, B or G). The reading beams, thus depleted, are reflected rearwardly in the direction of the mask 11.

When, as shown in Fig. 1, the tube is provided with an auxiliary collector electrode 13, the reflected electrons 16 pass through the apertures in said electrode and impinge upon the rear surface 11a of the mask 11 and release secondary-electrons 17 therefrom. These secondary-electrons are drawn to the collector 13 by the relatively higher voltage on that electrode. The resulting signals are taken off the collector 13 through a lead 18 which may be connected to any suitable output circuit, here exemplified by the capacitor 19.

In operating the storage tube of Fig. 2, wherein the beam source comprises one gun (8') for the writing side (1w) and one gun (9') for the reading side (1t) of the storage electrode, each beam must be rotated and interrupted so that, during its scanning movement, it sequentially occupies the three separate positions of the three beams from the three-gun batteries of Fig. 1. As previously pointed out, the coil assembly M1, nearest the gun, supplies the fields required to rotate the beams, the central coils M2 supply the focusing fields and the innermost coils M3 supply the scanning fields for the separate beams. The signals for each component of the image or "message" are, of course, applied to the input beam while the beam is in the particular angular position allotted to that component. As previously mentioned, the mask 11 on the take-off side 1t of the storage electrode here serves as the signal output electrode and is connected to the utilization circuit 19' by an external lead 18'.

Obviously, the problem of converting signals of one "standard" into signals of another "standard" is simplified when the frame frequencies of both "standards" are the same. (The field and line frequencies are assumed to be quite different.) Frames of $^1/_{15}$ second are suitable in converting so-called "field sequential" signals into (RCA) "dot-multiplex" signals. (This causes each charge area on the storage electrode 1 to be charged and discharged once per frame.) However, various combinations of frame frequencies may be used. Should the selected frame frequencies be such that the output signals exhibit "color dilution," or analogous "distortion," the difficulty may be cured by use of the unmodulated-beam technique taught by Iams in U. S. P. 2,213,178. In this event, the writing "mask" 10 should be used as the signal input electrode for the unmodulated "writing" beam or beams.

While the storage tubes of the present invention, unlike the storage tubes of the prior art, are capable of converting color-television signals of one "standard" into signals of another "standard" it is not to be inferred that the invention is limited in its application to such use. Thus, it is believed apparent that the tubes herein described can, with equal facility, convert two or more trains of "black-and-white" television signals such as may be used in stereoscopic television (or radar, teleran or facsimile signals) into signals representative of a composite image of the original scenes or "messages."

What is claimed is:

1. An electron-storage device comprising an evacuated envelope containing a storage-electrode, a source of electrons, a mask containing a multiplicity of apertures mounted between said source and said storage electrode, and means for directing electrons from said source upon a surface of said storage-electrode along separate paths that diverge adjacent to said mask, whereby electrons traveling along said separate paths impinge upon respectively separate areas of said surface of said storage-electrode.

2. The invention as set forth in claim 1 and wherein means are provided for simultaneously subjecting the electrons in said separate paths to a scanning movement.

3. An electron-storage tube comprising an evacuated envelope containing a storage-electrode having oppositely located "writing" and "reading" surfaces, a beam-source of electrons mounted in spaced relation with respect to said storage electrode in a position to scan the writing surface thereof with electrons derived from said source, a mask mounted adjacent to said writing surface of said storage electrode and containing a multiplicity of apertures through which said electrons pass in their journey from said source to said writing surface, a second beam-source of electrons mounted in spaced relation with respect to said storage electrode in a position to scan the reading surface thereof with electrons derived from said second source, and a second mask mounted adjacent to said reading surface and containing a multiplicity of apertures through which electrons pass from said second beam-source to said reading surface.

4. The invention as set forth in claim 3 and wherein the surface of said second mentioned apertured mask that lies adjacent to the reading surface of said storage electrode comprises a dynode of an electron-multiplier and wherein an auxiliary electrode disposed intermediate said mask and the reading surface of said storage-electrode comprises a collector electrode for the secondary-electrons emitted by said dynode.

5. The invention as set forth in claim 3 and wherein at least one of said source of electrons comprises a battery of electron-guns trained along different paths which cross and diverge at said mask, whereby the electron beams from respective ones of said guns impinge upon discrete sub-elemental areas of that surface of the storage electrode upon which said battery of guns is trained.

6. The invention as set forth in claim 3 and wherein at least one of said sources of electrons comprises a single electron-gun, and wherein means are provided for rotating and interrupting the beam from said gun in a pattern and sequence calculated to convert said beam into a plurality of beam-parts having different trajectories which diverge at said mask to impinge upon discrete sub-elemental areas of that surface of the storage electrode upon which said gun is trained.

7. Method of converting a composite message represented by electrical signals of a first transmission-standard into electrical signals representative of the same composite message but of a second transmission-standard, said method comprising; applying the signals of said first standard to an electron beam, causing said beam to trace a raster of said composite message, dividing said raster into a multiplicity of discrete groups of electrons, converting said discrete groups of electrons into a multiplicity of groups of discrete electrostatic charges of a pattern corresponding to the pattern of said divided raster, and then converting said discrete electrostatic charges into electrical signals in the sequence dictated by said second transmission-standard.

8. Method of converting a composite message represented by electrical signals of a first transmission-standard into electrical signals of the same composite message but of a second transmission-standard, said method comprising; applying the electrical signals representative of the different components of said composite message to an electron-beam in the sequence dictated by said first transmission standard, causing said beam to trace a raster, dividing the electrons of which said raster is comprised into discrete groups of electrons, the number of elements in each group corresponding to the number of different components in said composite message and each of said elements being individual to a different one of said components, converting said divided raster into a correspondingly divided pattern of electrostatic charges, storing said pattern of electrostatic charges, and then removing said electrostatic charges from storage in the sequence dictated by said second transmission-standard while concomitantly converting said charges into electrical signals of said second transmission standard.

References Cited in the file of this patent

UNITED STATES PATENTS

| Number | Name | Date |
|---|---|---|
| 2,219,021 | Riesz | Oct. 22, 1940 |
| 2,245,364 | Riesz et al. | June 10, 1941 |
| 2,276,359 | Von Ardenne | Mar. 17, 1942 |
| 2,430,038 | Wertz | Nov. 4, 1947 |
| 2,516,314 | Goldsmith | July 25, 1950 |
| 2,547,638 | Gardner | Apr. 3, 1951 |

FOREIGN PATENTS

| Number | Country | Date |
|---|---|---|
| 866,065 | France | Mar. 31, 1941 |